(12) United States Patent
Sideris

(10) Patent No.: US 8,728,381 B2
(45) Date of Patent: May 20, 2014

(54) INJECTION MOULDING OF PLASTICS ARTICLES

(76) Inventor: Constantinos Sideris, Nicosia (CY)

( * ) Notice: Subject to any disclaimer, the term of this patent is extended or adjusted under 35 U.S.C. 154(b) by 236 days.

(21) Appl. No.: 13/263,120

(22) PCT Filed: Mar. 8, 2010

(86) PCT No.: PCT/EP2010/052882
§ 371 (c)(1),
(2), (4) Date: Oct. 6, 2011

(87) PCT Pub. No.: WO2010/115669
PCT Pub. Date: Oct. 14, 2010

(65) Prior Publication Data
US 2012/0025425 A1   Feb. 2, 2012

(30) Foreign Application Priority Data
Apr. 6, 2009  (GB) .................................. 0905950.2

(51) Int. Cl.
*B29C 45/40*  (2006.01)
*B29C 45/17*  (2006.01)
*B29C 45/72*  (2006.01)
*B29C 35/16*  (2006.01)

(52) U.S. Cl.
CPC ......... *B29C 45/1771* (2013.01); *B29C 45/7207* (2013.01); *B29C 35/16* (2013.01); *B29C 2035/1616* (2013.01)
USPC ........ 264/537; 264/328.8; 264/538; 425/533; 425/534; 425/547; 425/588

(58) Field of Classification Search
CPC ............ B29C 2035/1616; B29C 35/16; B29C 45/7207; B29C 45/1771
USPC ..................... 264/535, 537, 538, 237, 328.8; 425/526, 532, 533, 534, 547, 588
See application file for complete search history.

(56) References Cited

U.S. PATENT DOCUMENTS

| | | | |
|---|---|---|---|
| 5,772,951 A * | 6/1998 | Coxhead et al. .............. 264/537 |
| 6,139,789 A * | 10/2000 | Neter et al. .................... 264/535 |
| 6,296,473 B1 * | 10/2001 | Ohlmann ...................... 425/547 |
| 7,264,463 B2 * | 9/2007 | Domodossola et al. ...... 425/444 |
| 7,591,975 B2 * | 9/2009 | Kintzinger et al. ........... 264/571 |
| 2006/0121153 A1 | 6/2006 | Neter et al. |
| 2006/0138696 A1 | 6/2006 | Weinmann |

FOREIGN PATENT DOCUMENTS

CN   101072667 A   11/2007
DE   92 06 503 U1   7/1992

(Continued)

OTHER PUBLICATIONS

British Search Report, dated Aug. 24, 2009, from corresponding British application.

(Continued)

*Primary Examiner* — Jill Heitbrink
(74) *Attorney, Agent, or Firm* — Young & Thompson

(57) ABSTRACT

An injection moulding apparatus includes an openable mould (1, 3) having a plurality of cavities for injection moulding articles (6), and, disposed below the mould cavities, a plurality of post cooling cavities (13) into which in use released injection moulded articles (6) may pass at least partially under gravity when released from the mould cavities.

14 Claims, 5 Drawing Sheets

(56) References Cited

FOREIGN PATENT DOCUMENTS

| | | |
|---|---|---|
| JP | 63-11317 A | 1/1988 |
| JP | 7-171888 A | 7/1995 |
| JP | 11-226968 A | 8/1999 |
| JP | 2000-289098 A | 10/2000 |
| JP | 2003-62874 A | 3/2003 |
| WO | 00/06356 A1 | 2/2000 |

OTHER PUBLICATIONS

International Search Report, dated Jun. 7, 2010, from corresponding International application.
CN Office Action dated Aug. 23, 2013, with English translation; Application No. 201080022183.7.
CN search report, dated Feb. 25, 2014, from corresponding 201080022183.7 application.

* cited by examiner

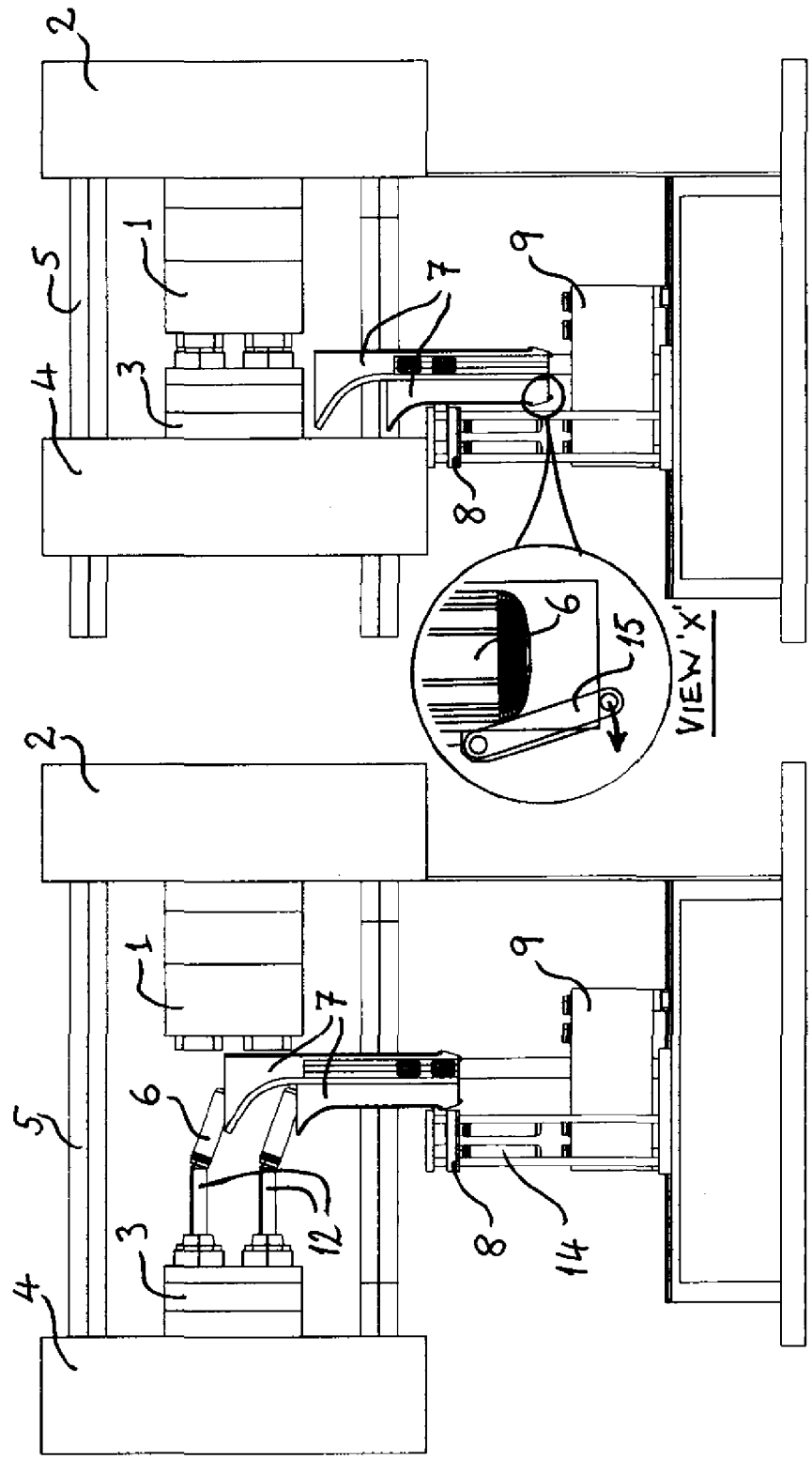

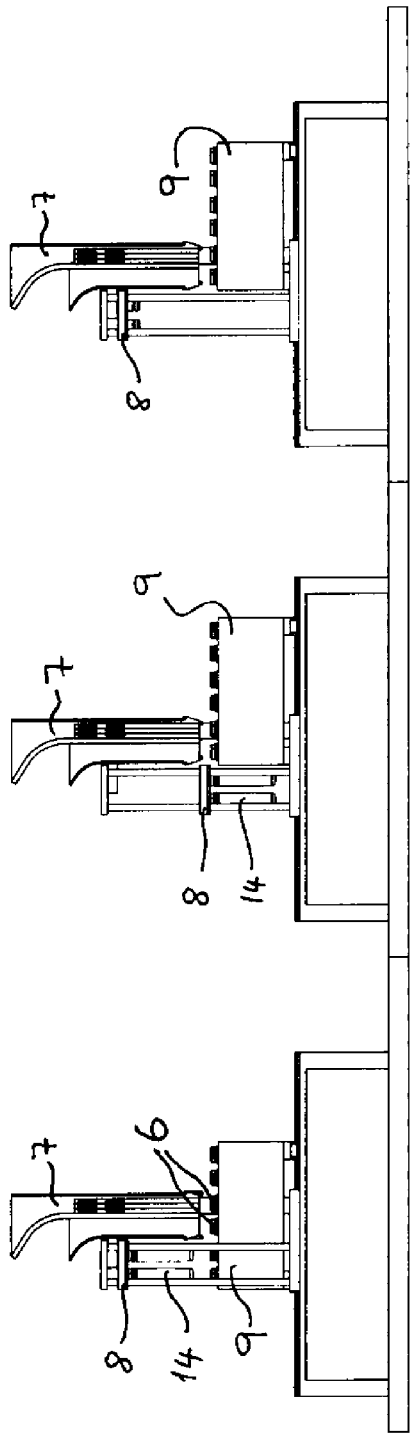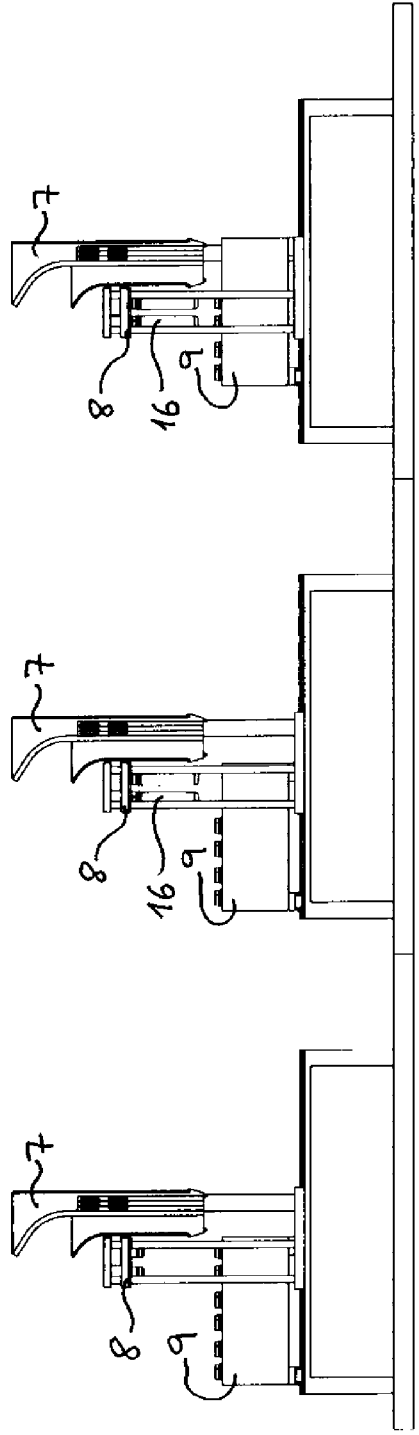

INJECTION MOULDING OF PLASTICS ARTICLES

The present invention relates to a method and apparatus for improving the injection moulding of plastics articles, with the use of additional cooling outside the injection mould to reduce production cycle times.

BACKGROUND

Injection moulding machines and moulds are commercially available for the production of injection moulded plastic articles. During the moulding cycle, molten plastic is injected in the cavities of the mould and usually the mould, which is cooled by circulating chilled water, remains closed until the injected article is sufficiently cold to be ejected from the mould and is free dropped by gravity.

When the walls of the moulded article are thick, more cooling time is required, making the cycle time longer and reducing production output. To overcome this problem, systems are available where the mould opens before the article is fully cooled and is ejected into a robot arm, which takes the warm article to be cooled further outside the mould (post cooling), either in one or more post cooling stations beside the injection moulding machine or in the robot arm itself, which then has cooling means incorporated. In this way the mould can open sooner to save cycle time, however there is substantial cost in providing a robot with fast movements and complex cooling means. Such methods of post cooling are the most widely used and a particular version is covered in CN101072667 (HUSKY). Although providing for good post cooling, the method involves very costly robotic and handling equipment.

In other existing methods of providing post cooling, instead of being ejected onto a robot arm, the articles remain on the cores (male parts) of the injection mould for one or more extra cycles. In such cases two or more sets of cores must be provided, together with a mechanism to move each set of cores alternately between injection position and post cooling positions. Such methods make the cost of the injection mould much more expensive, because of the duplication of cores and other mould parts, including separate means of ejecting the articles.

An attempt to use vertical rather than horizontal post cooling positions, in order to take advantage of the force of gravity to keep the articles in contact with the cooling surfaces of post cooling positions is described in JP2000289098 (NISSEI). In this case however, a non-standard injection moulding machine is used, with a vertical clamping unit instead of the usual horizontal clamping. Furthermore, complex handling equipment is required.

SUMMARY OF THE INVENTION

Accordingly there is a need for a method and apparatus for effectively achieving cooling of articles outside the injection mould in order to shorten cycle times, but without requiring expensive robotic and/or cooling equipment and/or handling equipment and/or moulds.

In one aspect, this invention provides an injection moulding apparatus comprising an openable mould having a plurality of cavities for injection moulding articles, and, disposed below said mould cavities, a plurality of post cooling cavities into which in use released injection moulded articles may pass at least partially under gravity when released from said mould cavities.

Preferably said injection moulding apparatus includes a plurality of guide means for guiding in use a released article into alignment with a post-cooling cavity. Said plurality of guide means may comprise an array of chutes having upper ends positionable to receive respective articles released from said mould cavities, and lower ends positionable to discharge the articles into selected post-cooling positions. Preferably said mould cavities are arranged in rows and said array of chutes is stepped so that the upper ends thereof are in substantially the same relative orientation to each of the respective mould cavities. Said plurality of guide means is preferably movable together between an upper, receiving position and a lower, delivery position. Each of said guide means may include a releasable retaining element for retaining an article at least partially in said guide means, but releasable to allow said retained articles to drop into respective post-cooling cavities. Said releasable retaining elements may be configured to be released by vertical movement of said guide means as said guide means approaches or arrives at said lower, delivery position.

The injection moulding apparatus advantageously includes gripping elements for gripping cooled articles in said post-cooling cavities, withdrawing them from said cavities, and releasing said articles. Said gripping elements may be mounted at or adjacent the guide means and movable vertically between a position in which they are operable to grip in use respective upper portions of the cooled articles in the post-cooling cavities, and a position in which the gripped articles are lifted clear of the cavities.

Where said moulded articles are of hollow tubular form open at one end and closed at the other, each said gripper element conveniently includes an elongate element for engaging the inner surface of the closed end of the article in use. Said elongate elements may be movable relative to the gripper elements and biased downwardly relative thereto, to apply a downward force to the articles in said post-cooling cavities. At least some of the gripper elements and/or the elongate elements may be cooled, thereby in use to extract heat from said article.

Said post-cooling cavities may be disposed in one or more arrays in a cooling block. The number of post-cooling cavities is preferably an integral multiple of the number of mould cavities, thereby to allow in use said articles to remain in said cooling cavities for a duration generally equivalent to a corresponding multiple of the moulding process cycle duration. Conveniently, a cooling arrangement is provided for said cooling block. Preferably said cooling block is movable horizontally to align said guide means with selected post-cooling cavities.

In another aspect, this invention provides a method of injection moulding comprising the steps of:
   providing an openable injection mould having a plurality of cavities for injection moulding articles;
   moulding a plurality of articles in said cavities;
   opening said mould to release said injection moulded articles, and
   allowing said released injection moulded articles to pass at least partially under gravity into respective post cooling cavities disposed generally below said mould.

BRIEF DESCRIPTION OF THE DRAWINGS

The invention can be performed in various ways and, by way of example only, specific embodiments thereof will now be described, reference being made to the accompanying drawings.

FIGS. 3a and 3b illustrate the operation of an apparatus for production of articles by injection moulding including post cooling, according to the present invention, during the production cycle phase where the injection mould is open.

FIGS. 4a to 4f illustrate the operation of an apparatus for production of articles by injection moulding including post cooling, according to the present invention, during the production cycle phase where the injection mould is closed.

DESCRIPTION OF PREFERRED EMBODIMENTS

In the illustrated embodiments, by way of example, the moulded articles are test-tube shaped preforms, usually used in stretch blow moulding of bottles, so they have a screw threaded neck portion. To release the threaded portions of the preforms, the neck parts of the injection mould (known as neck rings) must split open, making it convenient to arrange the cavities in lines. In the embodiment illustrated, the cavities are arranged in two lines in the injection mould.

Figure 1:
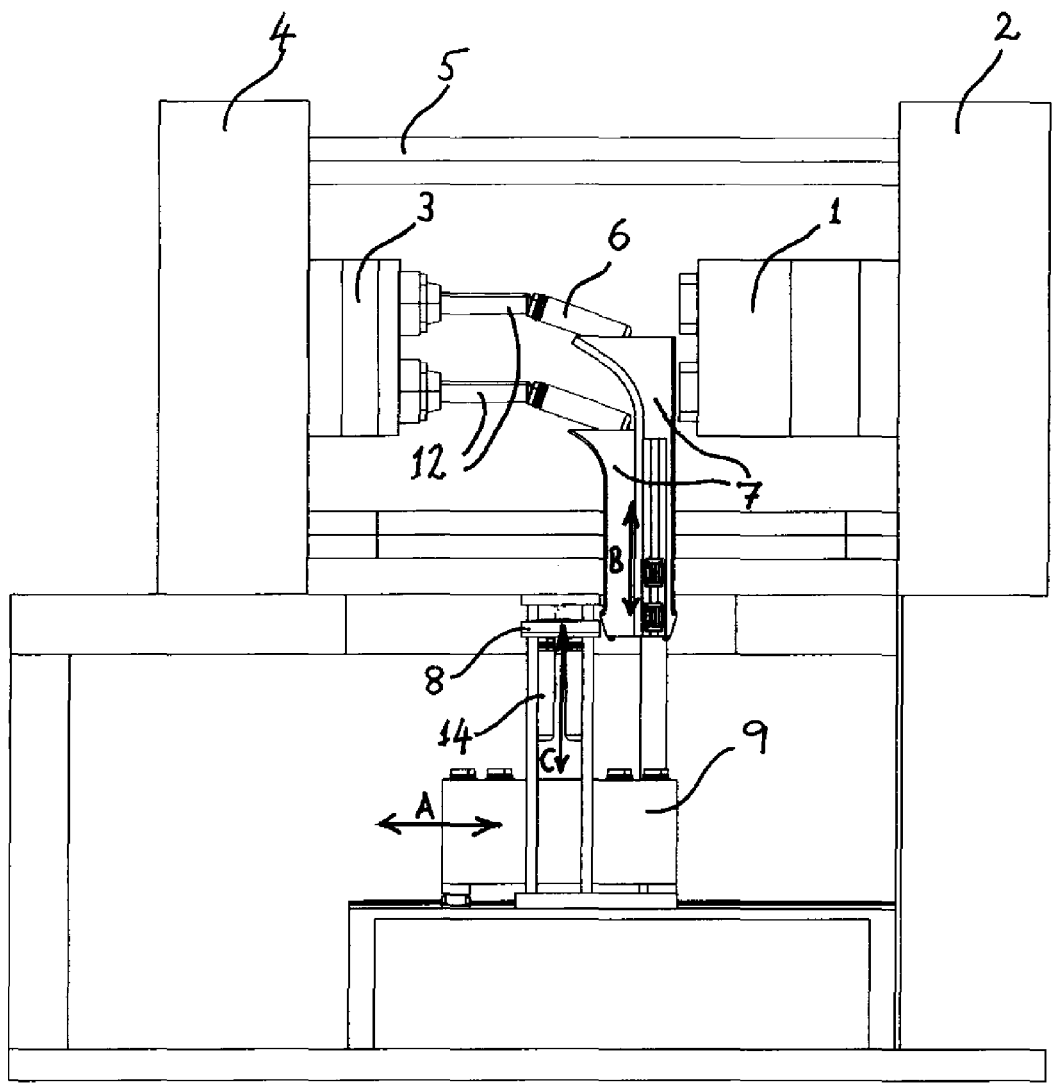
FIG. 1 is a side elevation of an apparatus for production of articles by injection moulding including post cooling, according to the present invention with the mould in open position.
Figure 2:
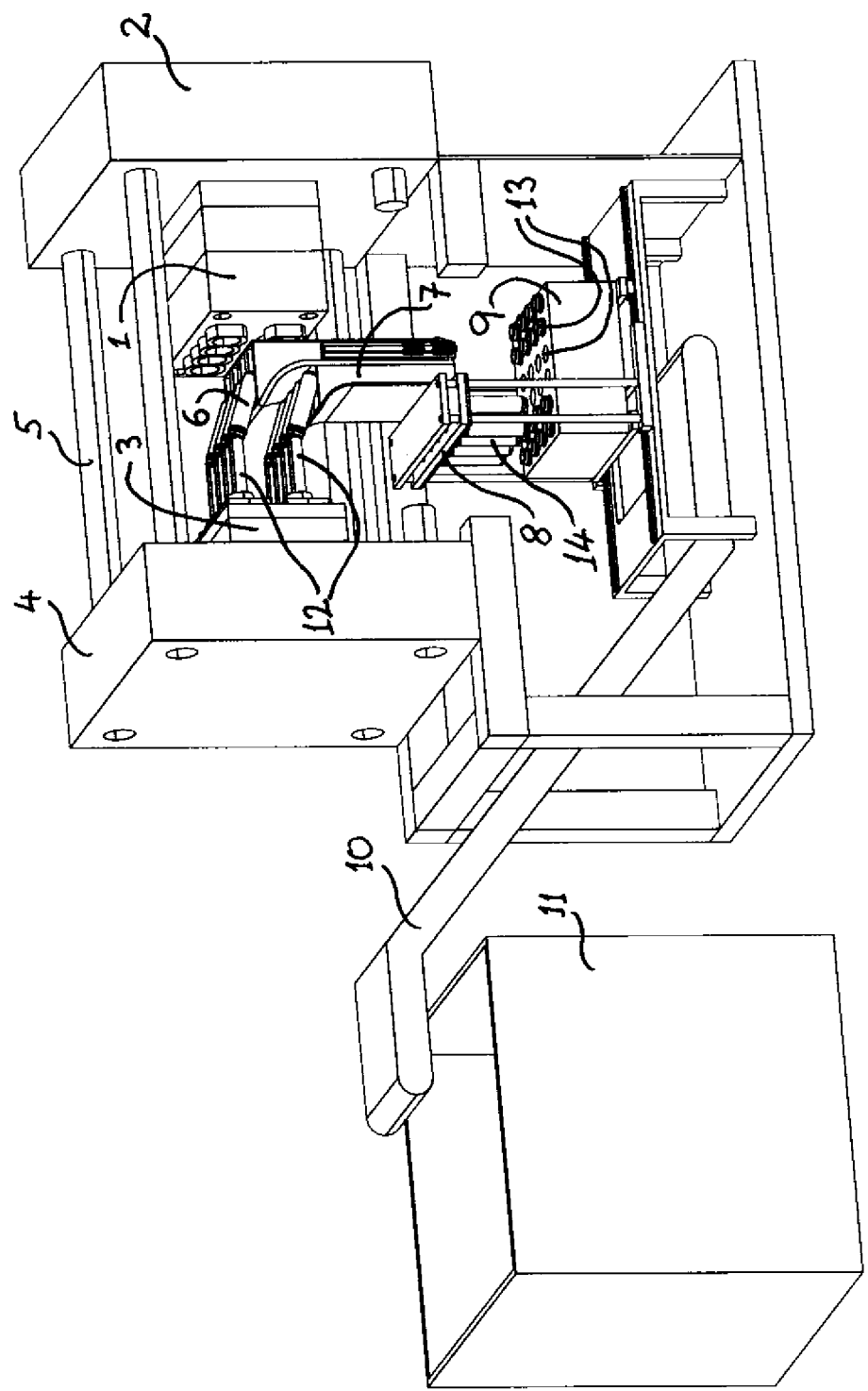
FIG. 2 is a perspective view of an apparatus for production of articles by injection moulding including post cooling, according to the present invention with the mould in open position.

In the arrangement illustrated in FIGS. 1 and 2 an injection mould with a fixed half 1 mounted on the fixed platen 2 of an injection moulding machine and a movable half 3 mounted on the moving platen 4 of an injection moulding machine, the moving platen 4 being guided by four tie bars 5 in conventional manner, produces articles 6 which are ejected from the cores 12 of the mould moving half 3 and dropping by gravity into guiding chutes 7. The articles 6 are ejected from the cores in any suitable manner as used in conventional injection moulding machines.

The guiding chutes 7 align the articles with cooling positions located in a cooling block 9, located below the mould 1, 3. One array of grippers 8 is provided for removing cooled articles 14 from cooling positions, freeing such cooling positions for receiving newly moulded articles 6.

The preferred arrangement illustrated in FIGS. 1 and 2, in which by way of example the injection mould 1, 3 consists of a total of eight cavities, which are arranged centrally in the clamping platens 2, 4 in two horizontal lines of four cavities each. The cooling positions 13 contained in the cooling block 9 are able to move back and forth in a horizontal direction, parallel with the mould opening direction as shown by the arrows 'A' in FIG. 1. The guiding chutes 7 are able to move in a vertical direction as shown by the arrows 'B' in FIG. 1. The grippers 8 are also able to move in a vertical direction as shown by the arrows 'C' in FIG. 1.

As illustrated in FIG. 2, there are three sets of eight cooling positions 13 each, totalling twenty four, which are arranged in six lines of four positions each. Each of the three sets of cooling positions 13 can take articles moulded in successive production cycles, so each article is subjected to cooling in the cooling block 9 during the time of three production cycles. The guiding chutes 7 consist of eight guiding chambers, one chamber for each article 6 moulded in each production cycle. The array of grippers 8 has eight grippers, which are able to remove one set of eight cooled articles 14 from the cooling block 9. The grippers can then release the eight cooled articles 14, which can drop onto a conveyor 10 for transport into storage bin 11.

FIGS. 3 and 4 illustrate the sequence of operations during one production cycle for the preferred embodiment of FIGS. 1 and 2. In FIG. 3 the sequence of operations during the mould open phase of one production cycle is illustrated in two side elevations. In FIG. 3a the moving platen 4 of the injection moulding machine is in the open position, having opened the mould 1, 3 to expose the moulded preforms 6 that are being ejected from the cores 12 of moving mould half 3. The gripper array 8 is holding one set of eight preforms, which it had just picked up from the middle of the three sets of cooling positions 14 of cooling block 9, in order to free these positions for receiving the preforms 6 that have just been moulded. After the gripper array 8 removed the cooled preforms 14, the cooling block 9 has moved horizontally in a position that aligns the free cooling positions with the guiding chutes 7, ready to receive the newly moulded preforms 6.

After the preforms 6 have been ejected, the guiding chutes move vertically downwards and the moving platen 4 closes, as illustrated in FIG. 3b. At this point in the production cycle, the preforms 6 are held at the bottom of the guiding chutes 7, as is illustrated in the enlarged view 'X' in FIG. 3b. The preforms 6 are held at the bottom of the guiding chutes 7 by movable flaps 15, which can move in the direction of the arrow in the enlarged view 'X' to release the preforms 6 to drop into their cooling positions in cooling block 9. This can happen just after the guiding chutes have completed their downward movement.

In FIG. 4 the sequence of operations during the mould closed phase of one production cycle is illustrated in six side elevations. While the mould is closed and in parallel with the injection moulding cycle, as illustrated in FIG. 4a the preforms 6 have been dropped by the action of the flaps 15 at the bottom of the guiding chutes 7 into their corresponding set of cooling positions in cooling block 9. The cooling block 9 then moves to its furthest position away from the gripper array 8 as shown in FIG. 4b. The gripper array 8 holding the previously removed preforms 14 then moves downward in a position ready to release the preforms 14. It is better not to allow preforms to drop a long distance, to avoid surface deterioration due to impact. In FIG. 4c the preforms 14 have been released by the gripper array 8, which then moved upwards.

Once the gripper array 8 is empty, the cooling block 9 moves to a position that aligns the next set of cooled preforms to be removed, with the gripper array 8 as illustrated in FIG. 4d. In order to maximise the cooling time that the preforms spend in the cooling positions, the gripper array 8 removes preforms from cooling block 9 as late as possible in the production cycle, just before or during mould opening. FIG. 4e shows the gripper array 8 having removed the cooled preforms 14 from the cooling block 9, thus freeing one set of cooling positions for receiving newly moulded preforms in the next cycle. In FIG. 4f the cooling block 9 has moved to align the free cooling positions with the guiding chutes 7 in readiness to receive the new preforms. The mould can then open for the next cycle and as soon as it does the guiding chutes 7 move upwards to receive the new preforms.

By way of example in the described embodiment of the present invention there were three sets of post cooling positions in the cooling blocks, but the invention can be applied with any integral number of sets of post cooling positions, such number being the number of cycles during which post cooling is applied. The thickness of the articles and the characteristics of the injection moulding machine can affect the number of sets of post cooling positions that is optimal.

The present invention can be implemented with the use of male shaped parts that could have two functions. Firstly they could be used to push downwards the articles being cooled, so that they retain good contact with the cooling surface of the cooling position for more effective cooling. Secondly, considering that the gate area of moulded articles is the hottest, it may be desirable to enhance the cooling at this area, so the male shaped parts could have their tips shaped according to the inside of the article near its gate so that through good contact with the articles the male shaped parts can remove heat from the gate area. To achieve this, cooling fluid like chilled water could circulate in the male shaped parts.

Figure 5:
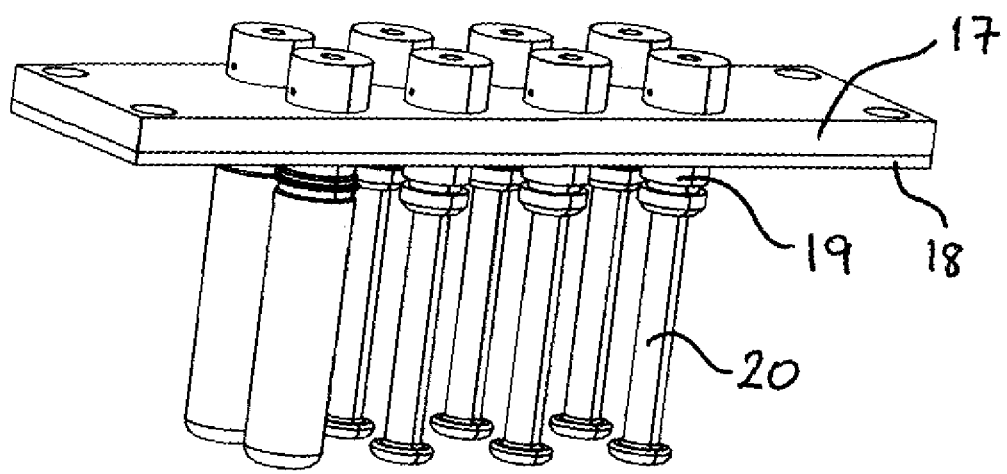
FIG. 5 is a perspective view of a transfer means for removing articles from their cooling positions, which also includes male shaped parts for pushing the articles onto the cooling surface and for cooling their gate area.

In another embodiment of the present invention, male shaped parts are incorporated with the gripper array 8, as is illustrated in FIG. 5, which is a perspective view of a gripper array with eight grippers, incorporating also eight male shaped parts 20 for pushing and cooling. There is a main support plate 17 on which the grippers 19 are mounted. In the example illustrated in FIG. 5 the grippers are designed to expand to engage preforms from the inside surface of the neck. An eject plate 18 is provided such that it can move downwards relative to the main plate 17 and the grippers 19, in order to push the preforms engaged by the grippers 19 off the grippers for ejecting the preforms. To enhance the effectiveness of their pushing and cooling functions, the male shaped parts 20 can be individually spring loaded, with springs pushing them downwards relative to the main plate 17. In this way, when the gripper array is lowered into a set of preforms during a production cycle, the tips of all of the male shaped parts 17 will make good contact with the gate area of all the preforms, irrespective of the fact that the vertical positions of the preforms may not be identical.

In the preceding descriptions of preferred embodiments the means of actuating the various moving parts were not shown, as several possible ways of achieving actuation may be used, in ways obvious to those familiar with the field.

Thus a method and apparatus have been disclosed that enable cycle time savings in injection moulding of plastic articles by applying post-mould cooling to the articles, which can be implemented in a simple and economical way with standard machines and moulds, avoiding complex robotic equipment. By implementing the present invention with the additional use of male shaped parts for additional pushing and/or cooling of the gate area, more cycle time savings and/or better article quality can be achieved.

The disclosed implementations provide a method and apparatus for injection moulding of plastic articles with additional cooling outside the injection mould, by locating one or more post cooling positions below the injection mould, and guiding the ejected articles to drop by gravity from the injection mould to the cooling positions below. Means of removing the cooled articles from the cooling positions are also provided.

The preferred method possesses the advantage that the transport of the articles from the mould to the cooling positions is achieved very economically by gravity, with the use of simple guiding means instead of complex robots.

Another advantage is that the cooling positions can be executed at lower cost as they do not have to be light-weight, because instead of having to move very fast by robotic mechanisms to save cycle time, any required movements can be made during dead times of the production cycle at lower speeds with simpler means of actuation.

The preferred method can be implemented using standard injection moulding machines, and injection moulds of standard design, taking advantage of such machines' and moulds' proven performance and favourable costs.

A further advantage is that of saving space because the cooling positions are placed in normally unused space below the clamping unit of the injection moulding machine, instead of to one or both sides of the machine as is the case with existing methods. Also they can easily be retrofitted or applied to existing machine/mould set-ups.

Thus in the preferred method, post cooling positions are provided, placed below the injection mould, and there are also innovative guiding means provided for guiding the ejected preforms to pass at least partially under gravity from the injection mould into their corresponding cooling positions. Further, article transfer means are provided, so that the cooled articles can be removed from the post cooling positions.

The term "placed below" is intended to cover arrangements where the post cooling positions are spaced vertically below the mould cavities as well as those where the post cooling positions are beneath and to one side.

The number of post cooling positions may be any integral multiple of the number of injection cavities. As such this integral multiple is the number of injection cycles during which post cooling can be applied to each moulded article after it is ejected from the injection mould. All such cooling positions can be conveniently located very near to each other, within one compact post cooling block, which can be provided with simple cooling means like circulating chilled water and executed at low cost. The guiding means can guide the dropping preforms to positions close to each other, enabling the distance between adjacent cooling positions to be smaller than the corresponding distance in the injection mould.

Usually in prior art methods of using post cooling, the moulded articles remain on the cores (male parts) of the injection mould and are ejected into horizontally oriented female positions on the robotic transfer/cooling apparatus. In the preferred implementation the post cooling positions are also female shaped, but with a generally vertical orientation rather than horizontal. In this way the article drops into position and as it shrinks during cooling it can be pulled by gravity to remain in good contact with the cooling surface of the female shape of the cooling position for more effective cooling. In the cases where article weight is insufficient for achieving this effect by gravity, additional means can be provided to pull or push the article in contact with the cooling surface.

One such means can be male shaped parts placed inside the articles, pushing the articles against the cooling surface, either by their own weight or by being actuated, eg spring loaded. Such male shaped parts can also be cooled, by circulating chilled water for example, so that they can additionally serve the function of cooling the articles from their internal surface, thus enhancing the cooling effect in the post cooling positions. In particular, such male shaped parts can be very effective in cooling the gate area of the articles, which is the hottest area and normally the one requiring additional cooling, which is a particularly beneficial feature, in that it is important for achieving good clarity in the gate area when using crystalline or partly crystalline plastic materials like PET.

When the articles to be produced have features in their design that require slides in the mould to release the articles during ejection, the injection cavities are usually arranged in a linear array or row to facilitate slide movement. In some implementations, to facilitate the guiding of the ejected articles downwards into the cooling positions, such rows of cavities extend in a horizontal orientation rather than a vertical orientation as is the case with existing methods.

The cooling positions may be provided with actuation means to move them in locations that align them with the guiding means (for accepting newly moulded articles) or with the transfer means (for article removal or male parts placement or removal) or in locations that allow articles to be released from the system. All such movements can be made during the injection moulding cycle when the mould is closed so the time required for such movements is not adding to the production cycle time. As a consequence such movements can be effected with simple low speed, low cost means.

The preferred implementation provides an injection moulding apparatus for moulding of plastic articles with application of post cooling outside the injection mould, comprising:
an injection mould with a plurality of cavities for moulding plastic articles;
injection means for injecting plastic material into said injection mould;
mould opening means for horizontally opening and closing said injection mould in use to allow release of moulded articles;
post cooling positions, located below the mould cavities,
guiding means for guiding released articles to pass at least partially under gravity towards the post cooling positions, and
transfer means for removing articles from post cooling positions and optionally for placing male shaped parts onto articles and removing such parts.

The injection means and the mould opening means may be constructed as in a conventional injection moulding machine. The post cooling positions may be vertically below the moulds or they may be below and to one side. The article transfer device could comprise any suitable arrangement but typically would include one or more arrays of means for article engagement and release, and actuation means for moving said arrays towards and away from post cooling locations. Such device could also possibly incorporate said male shaped parts and actuation means for such parts.

The preferred implementation provides a method for injection moulding of plastic articles with application of post cooling outside the injection mould, which comprises the steps of:
injecting plastic material into a provided injection mould, thus moulding plastic articles;
after partial cooling of the moulded articles in the said mould, opening the mould;
releasing moulded articles and allowing them to pass at least partially under gravity through provided guiding means into provided post cooling positions located below said injection mould,
removing cooled articles prior to said release of said moulded articles from said post cooling positions, thereby freeing such positions to receive said moulded articles;
optionally placing male shaped parts onto articles in said cooling positions and removing such parts.

In each cycle between the mould closing and the mould opening, articles are moulded in the injection cavities of the provided injection mould and previously moulded articles are being cooled in the post cooling positions. The number of post cooling positions that can be filled with articles to be cooled determines the number of cycles during which each article remains in post cooling. Just before or during mould opening, the transfer device removes one set of fully cooled articles from their cooling positions, freeing these positions for receiving the newly moulded articles, which are ejected from the injection mould.

Some movements required for the guiding means and/or the transfer means and/or the cooling block are achieved using the movement of the moving platen of the injection moulding machine. This eliminates the need for additional actuation means. For example the guiding means can be coupled with the moving platen in a way that as the moving platen opens it moves the guiding means into the correct position for guiding the newly moulded and ejected articles towards the cooling positions. Similarly as the moving platen closes, the guiding means are moved away to enable mould closing.

The invention claimed is:

1. An injection moulding apparatus comprising:
an openable mould having a plurality of cavities and a plurality of mould cores extending generally horizontally, for injection moulding articles having a generally horizontal orientation,
a plurality of substantially vertically directed post cooling cavities, disposed below said mould cavities and into which in use released injection moulded articles may pass at least partially under gravity when released from said mould cavities and ejected from said mould cores, and
an array of chutes having upper ends to receive respective moulded articles released from said mould cavities, and lower ends to discharge the articles into selected post-cooling cavities,
wherein, in use, said chutes receive said injection moulded articles upon release from said mould cores and change the alignment of each injection moulded article to a generally vertical orientation to pass into a respective post-cooling cavity, and
wherein said mould cavities are arranged in rows and said array of chutes is stepped so that the upper ends thereof are in substantially the same relative orientation to each of the respective mould cavities.

2. An injection moulding apparatus according to claim 1, wherein said plurality of chutes is movable together between an upper, receiving position and a lower, delivery position.

3. An injection moulding apparatus according to claim 2, wherein each of said chutes includes a releasable retaining element for retaining an article at least partially in said chutes, but releasable to allow said retained articles to drop into respective post-cooling cavities.

4. An injection moulding apparatus according to claim 3, wherein said releasable retaining elements are configured to be released by vertical movement of said chutes as said chutes approach or arrive at said lower, delivery position.

5. An injection moulding apparatus according to claim 1, which includes gripping elements for gripping cooled articles in said post-cooling cavities, withdrawing them from said cavities and releasing said articles.

6. An injection moulding apparatus according to claim 5, wherein said gripping elements are mounted at or adjacent the chutes and movable vertically between a position in which they are operable to grip in use respective upper portions of the cooled articles in the post-cooling cavities, and a position in which the gripped articles are lifted clear of the cavities.

7. An injection moulding apparatus according to claim 5, wherein said moulded articles are of hollow tubular form open at one end and closed at the other, and each said gripper element includes an elongate element for engaging the inner surface of the closed end of the article in use.

8. An injection moulding apparatus according to claim 7, wherein said elongate elements are moveable relative to the gripper elements and biased downwardly relative thereto, to apply a downward force to the articles in said post-cooling cavities.

9. An injection moulding apparatus according to claim 7, wherein at least some of the gripper elements and/or the elongate elements are cooled, thereby in use to extract heat from said article.

10. An injection moulding apparatus according to claim 1, wherein said post-cooling cavities are disposed in one or more arrays in a cooling block.

11. An injection moulding apparatus according to claim 10, wherein the number of post-cooling cavities is an integral multiple of the number of mould cavities, thereby to allow in use said articles to remain in said cooling cavities for a duration generally equivalent to a corresponding multiple of the moulding process cycle duration.

12. An injection moulding apparatus according to claim 10, wherein a cooling arrangement is provided for said cooling block.

13. An injection moulding apparatus according to claim 1, wherein said cooling block is movable horizontally to align said chutes with selected post-cooling cavities.

14. A method of injection moulding comprising:
providing an openable injection mould having a plurality of cavities and a plurality of mould cores extending substantially horizontally, for injection moulding articles for injection moulding articles having a substantially horizontal orientation, the cavities being arranged in rows;
providing an array of chutes having upper ends positionable to receive respective articles released from said mould cavities and lower ends positionable to discharge the articles, said upper ends being stepped so that they are in substantially the same relative orientation to each of the respective mould cavities;
moulding a plurality of articles in said cavities;
opening said mould to release said injection moulded articles on said mould cores,
ejecting said injection moulded articles from said mould cores,
allowing said ejected injection moulded articles to pass at least partially under gravity into respective, substantially vertical post cooling cavities disposed generally below said mould,
wherein, each ejected moulded article falls into a respective chute that changes an alignment of each injection moulded article into a substantially vertical orientation to pass into a respective post-cooling cavity.

* * * * *